(12) United States Patent
Wang et al.

(10) Patent No.: US 10,652,965 B2
(45) Date of Patent: May 12, 2020

(54) APPARATUS, DIMMABLE LIGHT EMITTING DIODE DRIVE CIRCUIT AND CONTROL METHOD

(71) Applicant: Silergy Semiconductor Technology (Hangzhou) LTD, Hangzhou, ZheJiang Province (CN)

(72) Inventors: Jianxin Wang, Hangzhou (CN); Huiqiang Chen, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 0 days.

(21) Appl. No.: 16/212,890

(22) Filed: Dec. 7, 2018

(65) Prior Publication Data

US 2019/0208597 A1 Jul. 4, 2019

(30) Foreign Application Priority Data

Jan. 3, 2018 (CN) .......................... 2018 1 0005548

(51) Int. Cl.
*H05B 33/00* (2006.01)
*H05B 33/08* (2020.01)

(52) U.S. Cl.
CPC ..... *H05B 33/0851* (2013.01); *H05B 33/0812* (2013.01); *H05B 33/0845* (2013.01)

(58) Field of Classification Search
CPC ............ H05B 41/2806; H05B 33/0815; H05B 33/0845; H05B 39/04; H05B 39/044; H05B 39/048; H05B 37/02; H05B 41/3924; H05B 33/0818; H05B 33/0848; H05B 41/3921; H05B 33/0851; H05B 41/38; H05B 33/0857; H05B 37/0272; H05B 33/0872; H05B 33/0896; H05B 37/0227; H05B 37/0254; H05B 37/0281; H05B 33/0803; H05B 33/0827; H05B 33/0869; H05B 33/0884; H05B 37/029; H05B 39/086; H05B 39/088; H05B 41/3927; H05B 33/0809; H05B 33/0842; H05B 33/0863; H05B 33/089; H05B 33/0824; H05B 33/086; H05B 33/0866; H05B 33/0887; H05B 37/0218; H05B 37/0245; H05B 39/02; H05B 39/08; H05B 41/382

See application file for complete search history.

(56) References Cited

U.S. PATENT DOCUMENTS

| | | | |
|---|---|---|---|
| 8,169,147 B2 | 5/2012 | Hsu et al. | |
| 8,614,551 B2 | 12/2013 | Chen et al. | |
| 8,829,819 B1 * | 9/2014 | Angeles | H05B 33/0815 315/219 |
| 9,125,270 B2 | 9/2015 | Liao et al. | |
| 9,578,706 B1 | 2/2017 | Lai et al. | |
| 2011/0018454 A1 | 1/2011 | Melnyk | |
| 2012/0230073 A1 | 9/2012 | Newman et al. | |

(Continued)

FOREIGN PATENT DOCUMENTS

CN 106888524 A 6/2017

*Primary Examiner* — Monica C King
(74) *Attorney, Agent, or Firm* — Michael C. Stephens, Jr.

(57) ABSTRACT

An apparatus can include: a light-emitting diode (LED) drive circuit having a silicon-controlled rectifier dimmer; and a bus voltage adjustment circuit configured to adjust a direct current bus voltage to delay a turn-on time instant of the silicon-controlled rectifier dimmer when a conduction angle signal is greater than an angle threshold.

20 Claims, 11 Drawing Sheets

(56) References Cited

U.S. PATENT DOCUMENTS

| | | |
|---|---|---|
| 2013/0343090 A1 | 12/2013 | Eom et al. |
| 2014/0062322 A1 | 3/2014 | Yu et al. |
| 2018/0310376 A1* | 10/2018 | Huang ............... H05B 33/0824 |
| 2019/0208597 A1* | 7/2019 | Wang ................. H05B 33/0812 |

* cited by examiner

APPARATUS, DIMMABLE LIGHT EMITTING DIODE DRIVE CIRCUIT AND CONTROL METHOD

RELATED APPLICATIONS

This application claims the benefit of Chinese Patent Application No. 201810005548.3, filed on Jan. 3, 2018, which is incorporated herein by reference in its entirety.

FIELD OF THE INVENTION

The present invention generally relates to the field of power electronics, and more particularly to LED drivers, along with associated circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
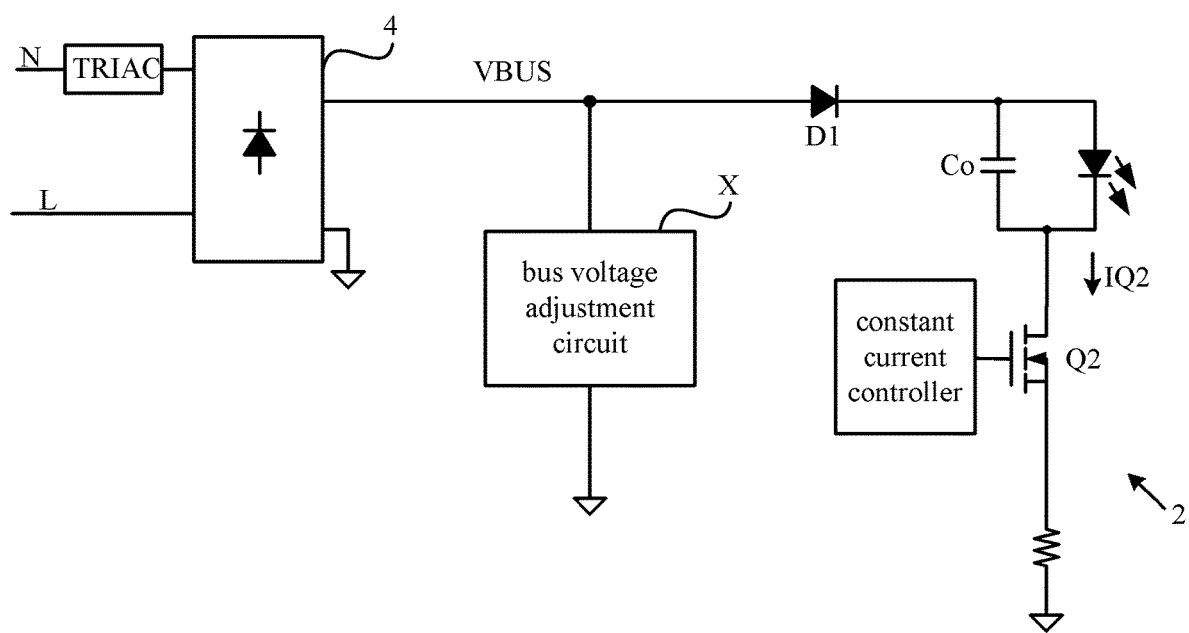
FIG. 1 is a schematic block diagram of an example LED drive circuit, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Silicon-controlled rectifier dimming is a commonly used dimming method. A phase control method may be utilized by a silicon-controlled rectifier dimmer (TRIAC) to perform dimming. That is, the silicon-controlled rectifier dimmer can be turned on in each half cycle of the sinusoidal wave in order to acquire the same conduction phase angle. By adjusting the chopper phase of the silicon-controlled rectifier dimmer, the conduction phase angle can be changed in order to perform dimming.

In one approach, a silicon-controlled rectifier dimmer may generally be combined with linear constant current control. Linear constant current control can be implemented by controlling a linear device (e.g., a transistor operable in a linear region) that is substantially connected in series with at least a portion of a light-emitting diode (LED) load in order to adjust the current flowing through the LED load so as to maintain current constant. A time period during which the silicon-controlled rectifier dimmer is turned on in an operating period (e.g., a half-wave period of the alternating current) may be indicated by a conduction angle. Further, a bleeder current can be sunk from the direct current bus, in order to ensure operation of the silicon-controlled rectifier dimmer.

When a conduction angle of silicon-controlled rectifier dimmer TRIAC is relatively large, a bleeder circuit can sink a bleeder current from a direct current bus to provide a turn-on current before silicon-controlled rectifier dimmer TRIAC is turned on. Due to the large conduction angle, a direct current bus voltage (VBUS) when silicon-controlled rectifier dimmer TRIAC is turned on may be lower than a lighting voltage (VLED), and the bleeder circuit can continue to sink the bleeder current to provide a holding current, so as to ensure that silicon-controlled rectifier dimmer TRIAC can effectively be turned on.

When the conduction angle of silicon-controlled rectifier dimmer TRIAC is relatively large, direct current bus voltage VBUS can be controlled at a desired value to be constant before silicon-controlled rectifier dimmer TRIAC is turned on, in order to reduce a time period of the bleeder current. However, one disadvantage of this approach is that the desired value of direct current bus voltage VBUS may not be changed for different conduction angles. Also, the bleeder current may be provided until direct current bus voltage VBUS rises to be greater than lighting voltage VLED, which can result in large circuit losses and reduced system efficiency. Further, the temperature of the circuit may be increased due to the heat generated by the bleeder circuit, which can further affect system performance.

Referring now to FIG. 1, shown is a schematic block diagram of an example LED drive circuit, in accordance with embodiments of the present invention. In this particular example, the LED drive circuit can include silicon-controlled rectifier dimmer TRIAC, linear drive circuit 2, rectification circuit 4, and bus voltage adjustment circuit X. Bus voltage adjustment circuit X can adjust a direct current bus voltage to delay a turn-on time instant of the silicon-controlled rectifier dimmer when a conduction angle signal is greater than an angle threshold. For example, bus voltage adjustment circuit X can increase the direct current bus voltage when the conduction angle signal is greater than the angle threshold, such that an absolute value of a difference between the direct current bus voltage when the silicon-controlled rectifier dimmer is turned on and a predetermined lighting voltage of an LED load is within a predetermined range.

For example, bus voltage adjustment circuit X can control the direct current bus voltage to be maintained at a first voltage when the conduction angle signal is greater than the angle threshold. The first voltage can be set such that the absolute value of the difference between the direct current bus voltage when the silicon-controlled rectifier dimmer is turned on and the predetermined lighting voltage of the LED load is within the predetermined range. The first voltage may be set based on the conduction angle signal. A large conduction angle signal may correspond to a large first voltage, in order to ensure that the direct current bus voltage when the silicon-controlled rectifier dimmer is turned on is near the lighting voltage. As such, the absolute value of the difference between the direct current bus voltage and the lighting voltage may be within the predetermined range. The predetermined range can be determined based on the particular application.

For example, bus voltage adjustment circuit X can increase the direct current bus voltage to delay the turn-on time instant of the silicon-controlled rectifier dimmer when the conduction angle signal is greater than the angle threshold. In this way, the direct current bus voltage when the silicon-controlled rectifier dimmer is turned on may not be less than the predetermined lighting voltage of the LED load.

Figure 2:
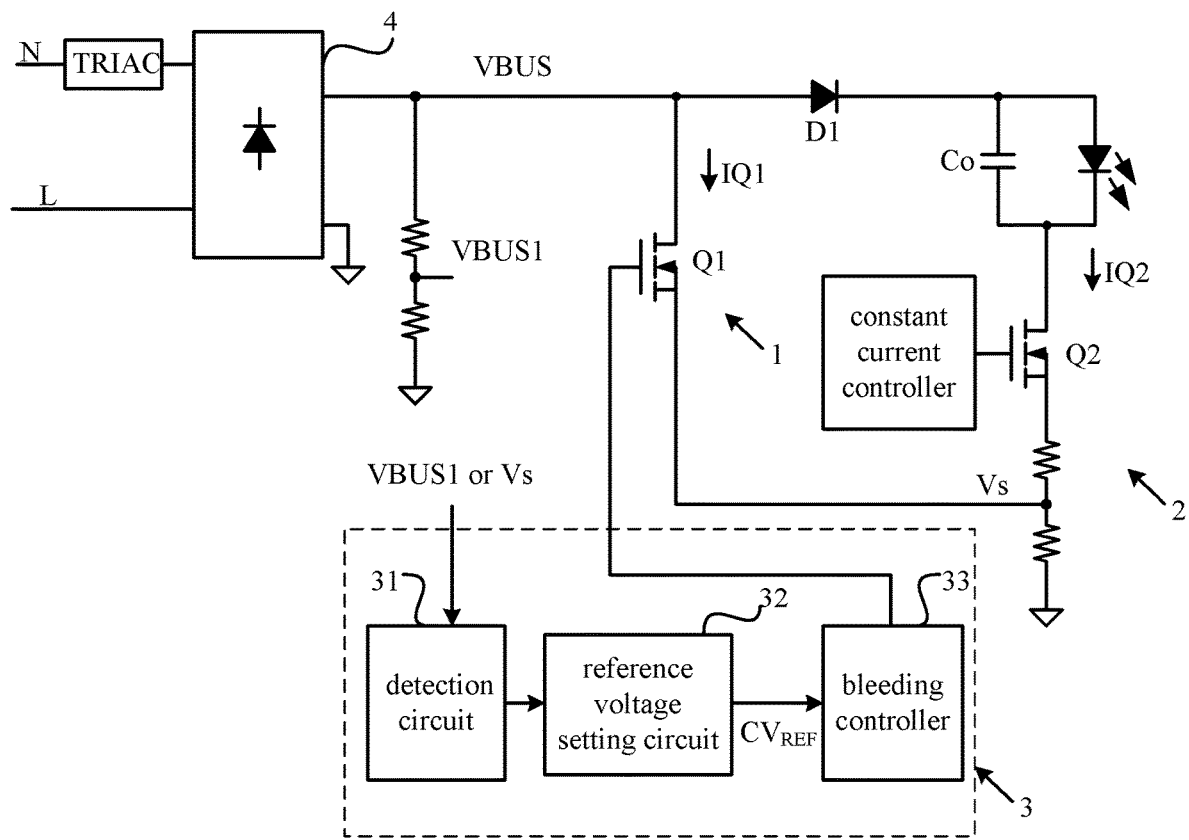
FIG. 2 is a schematic block diagram of an example detailed structure of the example LED drive circuit, in accordance with embodiments of the present invention.

Referring now to FIG. 2, shown is a schematic block diagram of an example detailed structure of the example LED drive circuit, in accordance with embodiments of the present invention. In this particular example, the LED drive circuit can include silicon-controlled rectifier dimmer TRIAC, bleeder circuit 1, linear drive circuit 2, control circuit 3, and rectification circuit 4. Silicon-controlled rectifier dimmer TRIAC can connect between rectification circuit 4 and an alternating current input terminal, in order to chop an alternating current input voltage. Rectification circuit 4 can convert the alternating current input voltage into direct current bus voltage VBUS at a terminal of the direct current bus. Bleeder circuit 1 can connect between a direct current voltage bus and a ground terminal to form a current path substantially in parallel with an LED load. Bleeder circuit 1 can sink a bleeder current from the direct current bus, and continuously maintain operation of silicon-controlled rectifier dimmer TRIAC.

Control circuit 3 and bleeder circuit 1 may form bus voltage adjustment circuit X. Control circuit 3 may acquire a conduction angle signal of the silicon-controlled rectifier dimmer and control a bleeder current of bleeder circuit 1, in order to adjust the direct current bus voltage and delay the turn-on time instant of the silicon-controlled rectifier dimmer. For example, control circuit 3 can adjust the direct current bus voltage when the conduction angle signal is greater than the angle threshold, such that direct current bus voltage VBUS when the silicon-controlled rectifier dimmer is turned on is near predetermined lighting voltage VLED (e.g., slightly less than or slightly greater than the lighting voltage VLED). Direct current bus voltage VBUS when the silicon-controlled rectifier dimmer is turned on can be controlled so that the absolute value of the difference between direct current bus voltage VBUS and lighting voltage VLED is relatively small, in order to reduce power losses of the LED drive circuit.

For example, the absolute value of the difference between direct current bus voltage VBUS and lighting voltage VLED may be range of from about 0V to about 30V. Thus, the bleeder current can be dynamically controlled based on the conduction angle signal to adjust the turn-on time instant of silicon-controlled rectifier dimmer TRIAC. As such, the time period during which bleeder circuit 1 sinks the bleeder current after silicon-controlled rectifier dimmer TRIAC is turned on, and the energy required for the bleeding, can be decreased as much as possible to reduce associated losses.

In particular embodiments, direct current bus voltage VBUS may be adjusted to not be less than predetermined lighting voltage VLED. The conduction angle may be defined as an angle indicating a conduction period of the silicon-controlled rectifier dimmer in an operation period. The conduction angle signal can indicate the conduction period or the conduction angle. Further, control circuit 3 can adjust a desired value of direct current bus voltage VBUS during bleeding process such that direct current bus voltage VBUS when silicon-controlled rectifier dimmer TRIAC is turned on is slightly greater than predetermined lighting voltage VLED. Thus, the bleeder current can be dynamically controlled based on the conduction angle signal to adjust the turn-on time instant, so that the bleeder circuit may not need to sink the bleeder current after silicon-controlled rectifier dimmer TRIAC is turned on, thereby reducing associated power losses.

For example, control circuit 3 may control the desired value of the direct current bus voltage to change with the conduction angle signal when the conduction angle signal is greater than the angle threshold, and to control the desired value of the direct current bus voltage to be a predetermined value when the conduction angle signal is less than the angle threshold. The predetermined value may correspond to a direct current bus voltage corresponding to the maximum conduction angle, and may be zero or greater than zero. For example, the desired value can be adjusted by adjusting reference voltage $CV_{REF}$ used by control circuit 3 to control the bleeding process. Reference voltage $CV_{REF}$ can indicate the desired value. When the conduction angle signal is greater than the angle threshold, the reference voltage may be set according to the following formula (1).

$$CV_{REF}=(Vcd-Vcd\_ref) \times K+CV_{REF\_MIN} \qquad (1)$$

Here, $CV_{REF}$ can denote the reference voltage, Vcd can denote the conduction angle signal, Vcd_ref can denote the angle threshold, and $CV_{REF\_MIN}$ can denote a reference voltage corresponding the predetermined value. The angle threshold may correspond to the conduction angle signal when the direct current bus voltage is equal to the predetermined lighting voltage at the turn-on time instant of the silicon-controlled rectifier dimmer, and K may denote a predetermined adjustment coefficient.

For example, the angle threshold can be set according to the following. For alternating current input power with commonly used parameters (e.g., the alternating current power of 220V and 50 Hz), when the silicon-controlled rectifier dimmer performs chopping at a conduction angle equal to the angle threshold, the voltage obtained by the chopping can be equal to or slightly greater than lighting voltage VLED. Thus, the direct current bus voltage at the turn-on time instant may be greater than lighting voltage VLED if the conduction angle signal is less than the angle threshold, and the direct current bus voltage at the turn-on time instant can be less than lighting voltage VLED if the conduction angle signal is greater than the angle threshold, but still have a higher value.

In this case, the bleeder circuit may sink the bleeder current from a high direct current bus voltage, which can be avoided by circuit control. In particular embodiments, when it is detected that the conduction angle signal is greater than the angle threshold, reference voltage CVREF for indicating the desired value of the direct current bus voltage may be set to change with conduction angle signal Vcd, as shown in above formula (1). Therefore, the direct current bus voltage can be raised as the conduction angle signal increases, in order to delay the turn-on time instant of silicon-controlled rectifier dimmer TRIAC, such that the direct current bus voltage at the turn-on time instant is raised to be a voltage greater than or slightly greater than lighting voltage VLED.

The conduction angle signal may be acquired in various ways. For example, the conduction angle signal may be acquired by detecting direct current bus voltage VBUS. For example, the conduction angle signal may be acquired by detecting a time period from a time instant when direct current bus voltage VBUS rises to a voltage greater than a first threshold to a time instant when direct current bus voltage VBUS decreases to a voltage less than a second threshold in an operation period. As another example, the conduction angle signal may be acquired by detecting a drive current of the LED load. For example, the conduction angle signal may be acquired by detecting a time period during which the drive current is continuously greater than a third threshold.

For example, control circuit 3 may form a voltage feedback loop based on direct current bus voltage sampling signal VBUS1, in order to control direct current bus voltage VBUS to change in a desired way before silicon-controlled rectifier dimmer TRIAC is turned on. Direct current bus voltage sampling signal VBUS1 may be obtained by performing sampling with a resistor voltage divider network arranged between the direct current bus and the ground terminal. Control circuit 3 may turn off the bleeder circuit when it is detected that silicon-controlled rectifier dimmer TRIAC is turned on, or direct current bus voltage VBUS rises to a voltage greater than lighting voltage VLED.

In FIG. 2, bleeder circuit 1 can include transistor Q1. Linear drive circuit 2 can include transistor Q2, and can control a drive current flowing through the LED load to maintain the drive current as substantially constant. The LED drive circuit may further include diode D1 connected between the bleeder circuit and the LED load, and filter capacitor Co connected in parallel with the LED load. One skilled in the art will recognize that diode D1 may be omitted or replaced with other suitable unidirectional circuits. Bleeder circuit 1 and linear drive circuit 2 may further be provided with resistors to sample the flowed bleeder current or drive current. In other examples, the resistors may alternatively be arranged in a manner different from that shown in FIG. 2.

Control circuit 3 may include detection circuit 31, reference voltage setting circuit 32, and bleeding controller 33. Detection circuit 31 can acquire conduction angle signal Vcd. Reference voltage setting circuit 32 may set reference voltage CVREF based on the conduction angle signal in the described-above manner, in order to adjust the desired value of the direct current bus voltage. Bleeding controller 33 can control the bleeder current of bleeder circuit 1 based on reference voltage $CV_{REF}$ and direct current bus voltage sampling signal VBUS1, such that direct current bus voltage VBUS changes along with the desired value indicated by reference voltage $CV_{REF}$. For example, bleeding controller 33 can generate a control signal to control transistor Q1, so as to adjust current IQ1 flowing through transistor Q1.

Figure 3:
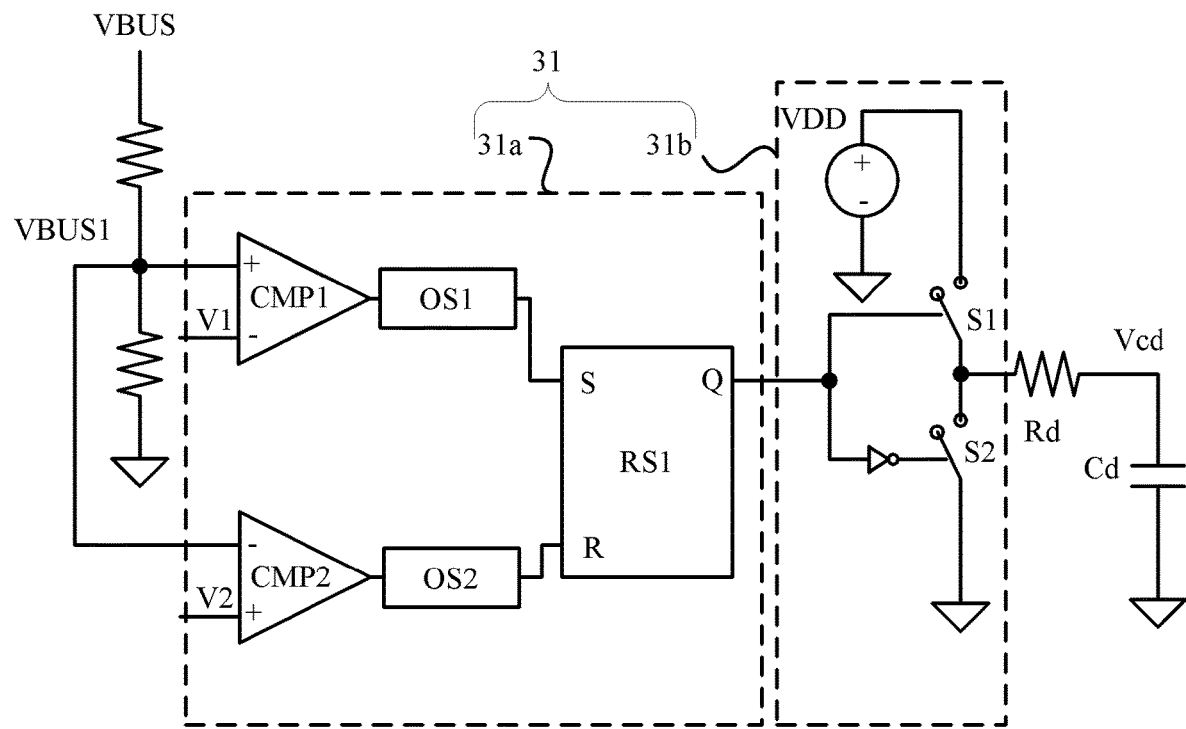
FIG. 3 is a schematic block diagram of an example detection circuit, in accordance with embodiments of the present invention.

Referring now to FIG. 3, shown is a schematic block diagram of an example detection circuit, in accordance with embodiments of the present invention. In this particular example, detection circuit 31 may acquire the conduction angle signal by detecting the direct current bus voltage VBUS. For example, detection circuit 31 may acquire a signal for indicating a time period from a time instant when direct current bus voltage VBUS rises to a voltage greater than a first threshold to a time instant when direct current bus voltage VBUS decreases to a voltage less than a second threshold, in order to acquire the conduction angle signal. The first threshold may be set to an integer multiple of the second threshold, so as to better reuse a voltage source.

Detection circuit 31 can include comparators CMP1 and CMP2, one-shot circuits OS1 and OS2, RS trigger RS1, voltage source VDD, switches S1 and S2, resistor Rd, and capacitor Cd. One input terminal of comparator CMP1 can receive direct current bus voltage sampling signal VBUS1 for indicating direct current bus voltage VBUS, the other input terminal of comparator CMP1 can receive threshold V1, and an output terminal of comparator CMP1 can connect an input terminal of one-shot circuit OS1. An output terminal of one-shot circuit OS1 can connect to a set terminal of RS trigger RS1. Thus, one-shot circuit OS1 may generate a pulse having a predetermined time length in response to a rising or falling edge of an input signal to set the output signal of RS trigger RS1.

One input terminal of comparator CMP2 can receive direct current bus voltage sampling signal VBUS1, the other input terminal of comparator CMP2 can receive threshold V2, and an output terminal of comparator CMP2 can connect to an input terminal of the one-shot circuit OS2. An output terminal of one-shot circuit OS2 can connect to a reset terminal of RS trigger RS1. Thus, one-shot circuit OS2 may generate a pulse having a predetermined time length in response to a rising or falling edge of an input signal to reset the output signal of RS trigger RS1. In this way, state controller 31a may be formed. State controller 31a can control charge and discharge circuit 31b to switch to a first state when it is detected that direct current bus voltage VBUS rises to a voltage greater than the first threshold, and can control the charge and discharge circuit 31b to switch to a second state when it is detected that direct current bus voltage VBUS decreases to a voltage less than the second threshold. The "first threshold" may correspond to threshold V1, and the "second threshold" may correspond to threshold V2.

Switches S1 and S2 can connect in series between a positive terminal of voltage source VDD and a ground terminal. Switch S1 can be controlled by output signal Q of the RS trigger, and switch S2 can be controlled by an inverting version of signal Q. Therefore, switches S1 and S2 can be in in opposite states. Resistor Rd and capacitor Cd can connect in series between a common connection terminal of switches S1 and S2 and the ground terminal. When switch S1 is turned on, switch S2 may be turned off, and capacitor Cd can be charged. When switch S1 is turned off, switch S2 may be turned on, and capacitor Cd can be discharged through resistor Rd and switch S2. In this way, charge and discharge circuit 31b may be formed.

Charge and discharge circuit 31b can charge capacitor Cd in the first state, and discharge capacitor Cd in the second state under control of the state controller. Resistor Rd and capacitor Cd may form an RC circuit, which can lead to hysteresis on the change of voltage Vcd across capacitor Cd due to the existence of resistor Rd. In this case, voltage Vcd may slowly change along with the conduction angle. Since voltage Vcd changes relatively little in an operation period, voltage Vcd at any one time instant in the operation period may serve as the conduction angle signal. Since the capacitor is conductive with respect to an instantaneous voltage (the capacitor has almost no resistance), an instantaneous current may be quite large when the capacitor is directly connected to voltage source VDD, which can result in a charging-end component possibly being burned. Therefore, the resistor can connect in series with the capacitor in order to limit a maximum current.

Figure 4:
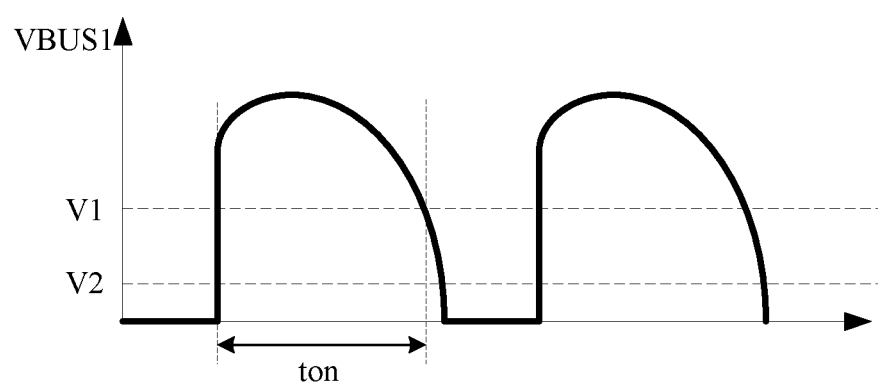
FIG. 4 is a waveform diagram of example operation of the detection circuit shown in FIG. 3, in accordance with embodiments of the present invention.

Referring now to FIG. 4, shown is a waveform diagram of example operation of the detection circuit shown in FIG. 3, in accordance with embodiments of the present invention. In this particular example, when the silicon-controlled rectifier dimmer is turned on, voltage VBUS1 rises with the direct current bus voltage to a voltage greater than threshold V1. When the operation period substantially ends, voltage VBUS1 decreases with the direct current bus voltage to a voltage less than threshold V2. Thus, voltage Vcd may change slowly in one operation period, and may indicate the time period ton from a time instant when the silicon-controlled rectifier dimmer is turned on to a time instant when the operation period substantially ends. It should also be understood that in detection circuit 31, the connection manner of the input terminal of the comparator, the trigger manner of the one-shot circuit, and the connection relation of the RS trigger may be adjusted based on the set of a valid level and the relation manner of the input signal.

Figure 5:
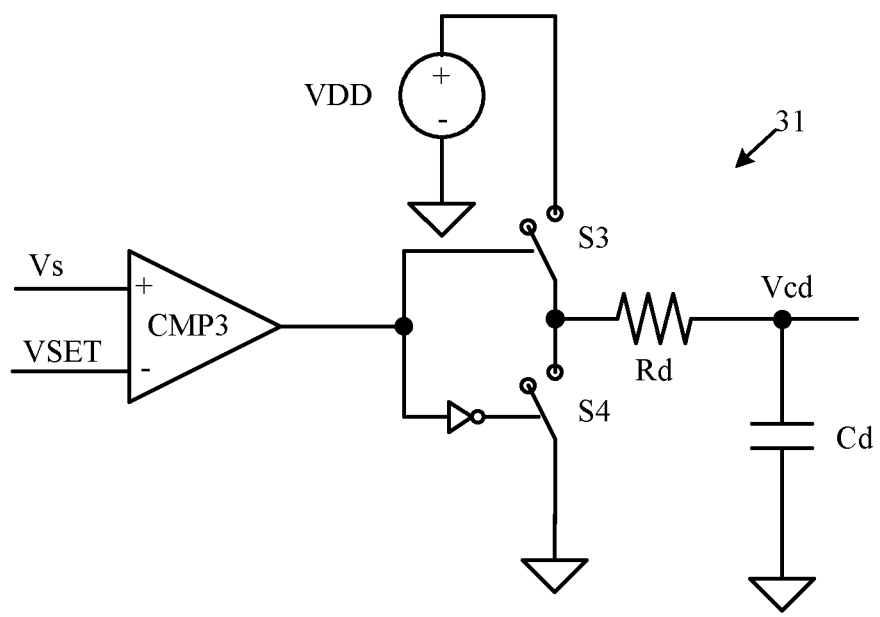
FIG. 5 is a schematic block diagram of another example detection circuit, in accordance with embodiments of the present invention.

Referring now to FIG. 5, shown is a schematic block diagram of another example detection circuit, in accordance with embodiments of the present invention. In this particular example, detection circuit 31 may acquire a signal for indicating a time period during which the drive current is continuously greater than a third threshold to acquire the conduction angle signal. Detection circuit 31 can include comparator CMP3, voltage source VDD, switches S3 and S4, resistor Rd, and capacitor Cd. One input terminal of comparator CMP3 can receive a current sampling signal Vs, and the other input terminal of comparator CMP3 may receive a threshold VSET. Switches S3 and S4 can connect in series between a positive terminal of voltage source VDD and a ground terminal.

Switch S3 may be controlled by an output signal of comparator CMP3, and switch S4 can be controlled by an inverted version of the output signal of comparator CMP3. Thus, switches S3 and S4 can be in opposite states. Resistor Rd and capacitor Cd can connect in series between a common connection terminal of switches S3 and S4 and the ground terminal. When the drive current is greater than a third threshold, current sampling signal Vs can be greater than threshold VSET, comparator CMP3 may output a high level, switch S3 can be turned on, switch S4 can be turned off, and voltage source VDD may charge capacitor Cd through switch S3 and resistor Rd.

Figure 6:
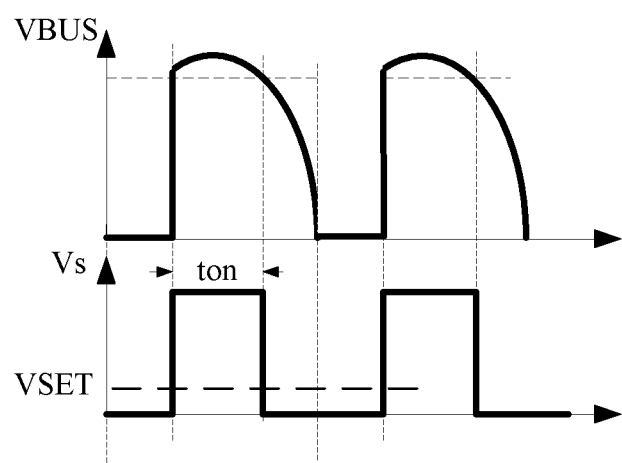
FIG. 6 is a waveform diagram of example operation of the detection circuit shown in FIG. 5, in accordance with embodiments of the present invention.

Referring now to FIG. 6, shown is a waveform diagram of example operation of the detection circuit shown in FIG. 5, in accordance with embodiments of the present invention. When the drive current is less than the third threshold (e.g., the drive current is actually close to zero), current sampling signal Vs may be less than threshold VSET, comparator CMP3 can output a low level, switch S3 may be turned off, switch S4 may be turned on, and capacitor Cd can be discharged through resistor Rd and switch S4. Due to resistor Rd, voltage Vcd across capacitor Cd may change slowly in an operation period, and can indicate the time period ton during which the LED load operates, which can correspond directly to the conduction angle. Therefore, the voltage Vcd in this implementation may serve as the conduction angle signal.

Figure 7:
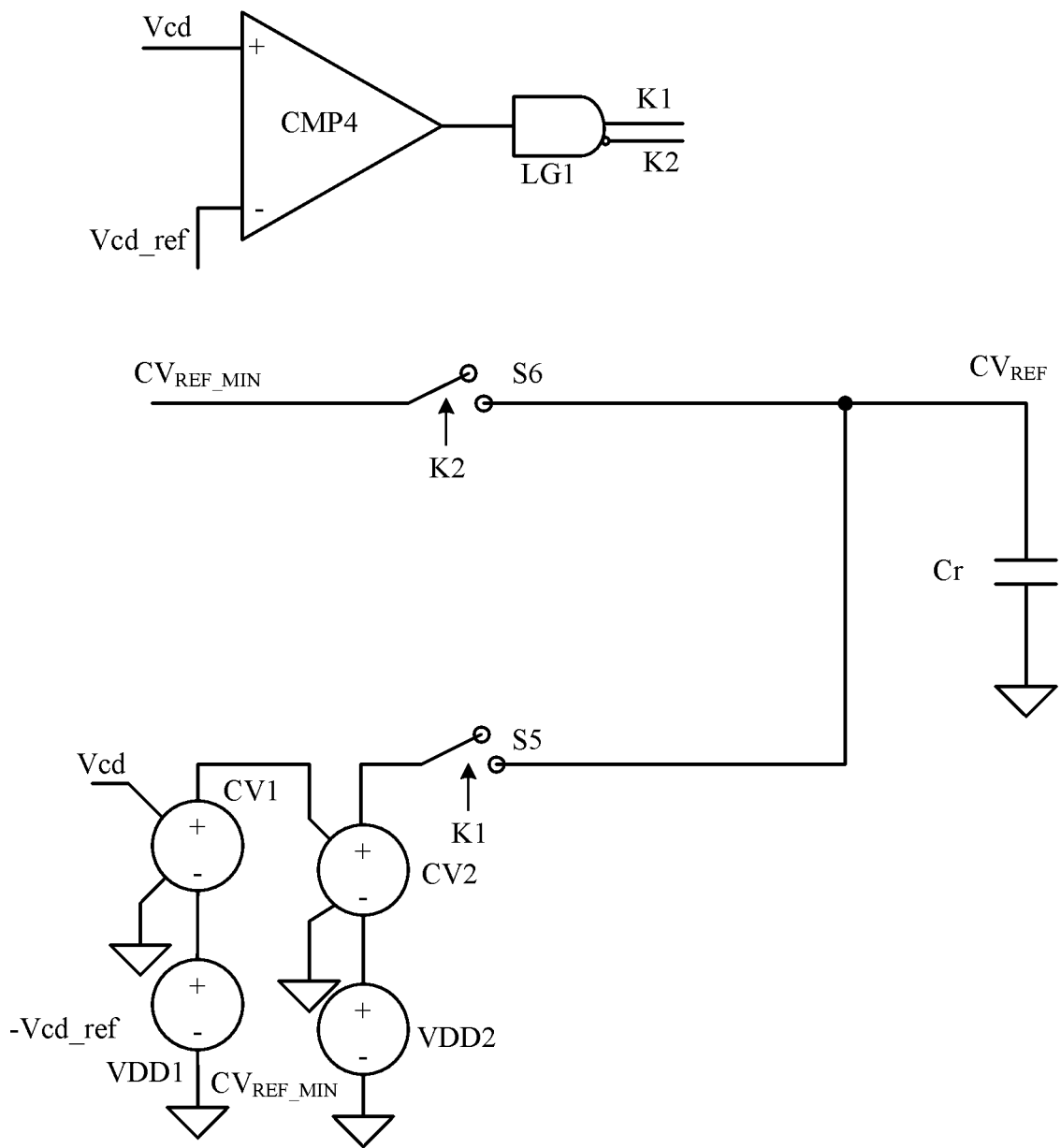
FIG. 7 is a schematic block diagram of an example reference voltage setting circuit, in accordance with embodiments of the present invention.

Referring now to FIG. 7, shown is a schematic block diagram of an example reference voltage setting circuit, in accordance with embodiments of the present invention. In this particular example, reference voltage setting circuit 32 can include comparator CMP4, logic circuit LG1, switches S5 and S6, voltage sources VDD1 and VDD2, controlled voltage sources CV1 and CV2, and capacitor Cr. One input terminal of comparator CMP4 can receive conduction angle signal Vcd, and the other input terminal of comparator CMP4 may receive angle threshold Vcd_ref. Logic circuit LG1 may generate non-inverting signal K1 and inverting signal K2 of an output signal of comparator CMP4. Switch S5 can be controlled by signal K1, and switch S6 may be controlled by signal K2. Switch S6 can control a path from a predetermined value (e.g., of a voltage signal) $CV_{REF\_MIN}$ to capacitor Cr. Switch S5 can control a path from a voltage expressed as $CV_{REF}=(Vcd-Vcd\_ref) \times K+CV_{REF\_MIN}$ to capacitor Cr.

Since the control signals for switches S5 and S6 are inverted, only one of the two voltage signals may be introduced to capacitor Cr. Further, a circuit formed by voltage sources VDD1 and VDD2 and controlled voltage sources CV1 and CV2 can be controlled by conduction angle signal Vcd, and may generate output voltage $CV_{REF}=(Vcd-Vcd\_ref) \times K+CV_{REF\_MIN}$. The voltage across capacitor Cr can be output as reference voltage $CV_{REF}$. Capacitor Cr can cause the reference voltage $CV_{REF}$ to change smoothly when being switched. Therefore, when conduction angle signal Vcd is less than angle threshold Vcd_ref, comparator CMP4 may output a low level, switch S6 can be turned on, switch S5 may be turned off, and reference voltage setting circuit 32 may generate reference voltage $CV_{REF\_MIN}$ corresponding to the predetermined value (e.g., of the voltage signal) as reference voltage $CV_{REF}$. In addition, when conduction angle signal Vcd is greater than angle threshold Vcd_ref, comparator CMP4 may output a high level, switch S6 can be turned off, switch S5 may be turned on, and reference voltage setting circuit 32 may generate voltage $CV_{REF}=(Vcd-Vcd\_ref) \times K+CV_{REF\_MIN}$ as reference voltage $CV_{REF}$.

Figure 8:
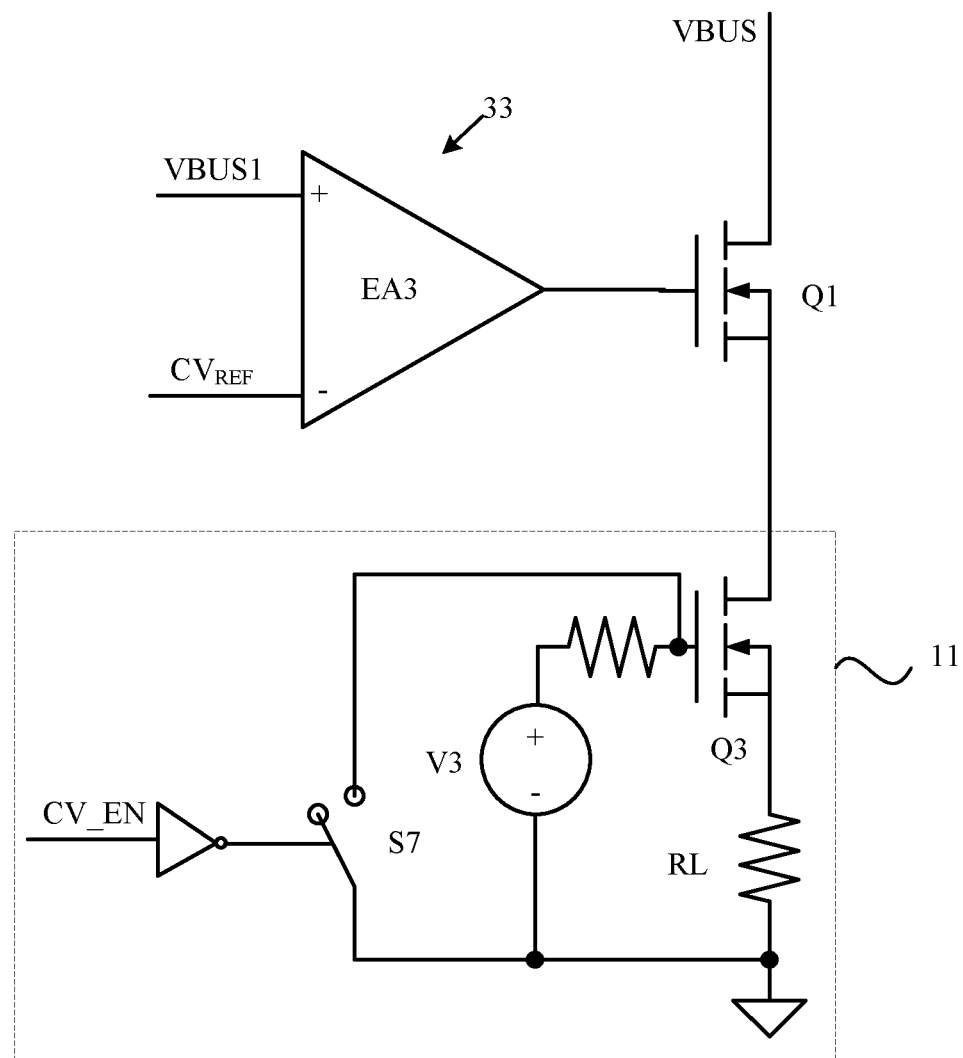
FIG. 8 is a schematic block diagram of an example bleeder circuit and bleeding controller, in accordance with embodiments of the present invention.

Referring now to FIG. 8, shown is a schematic block diagram of an example bleeder circuit and bleeding controller, in accordance with embodiments of the present invention. In this particular example, bleeder circuit 1 can include transistor Q1, and maximum current clamp circuit 11. Maximum current clamp circuit 11 and transistor Q1 can connect in series between the direct current bus and the ground terminal. Maximum current clamp circuit 11 may serve as a protection circuit for limiting a maximum value of a current. Since maximum current clamp circuit 11 is arranged on the bleeding path, this circuit can limit a maximum value of the bleeder current. That is, when bleeder current IQ1 is less than clamp current IMAX, maximum current clamp circuit 11 may be in a shoot-through state. When bleeder current IQ1 rises to clamp current IMAX, maximum current clamp circuit 11 can clamp the bleeder current to maintain bleeder current IQ1 at clamp current IMAX.

In addition, bleeding controller 33 can include error amplifier EA3. One input terminal of error amplifier EA3 can receive direct current bus voltage sampling signal VBUS1, the other input terminal of error amplifier EA3 may receive reference voltage $CV_{REF}$, and an output terminal of error amplifier EA3 may output a control signal to control the operation state of transistor Q1. Thus, a voltage feedback loop may be formed, and the direct current bus voltage can be maintained to correspond to reference voltage $CV_{REF}$ by adjusting the bleeder current. For example, bleeding controller 33 can regulate the bleeder current in accordance with an error between reference voltage CVREF and direct current bus voltage sampling signal VBUS1 to maintain the direct current bus voltage equal to the desired value. When the conduction angle is large, reference voltage $CV_{REF}$ can increase with the conduction angle signal, such that bus voltage sampling signal VBUS1 is adjusted to be increased, and direct current bus voltage VBUS is accordingly increased.

In particular embodiments, maximum current clamp circuit 11 can include transistor Q3, voltage source V3, resistor RL, and switch S7. Voltage source V3 can connect between a control terminal of transistor Q3 and the ground terminal. When a current flowing through transistor Q3 is equal to IMAX=(V3−Q3_th)/RL, bleeder current IQ1 of the current path may be clamped, where Q3_th is a turn-on threshold voltage of transistor Q3. Switch S7 can connect between a gate of transistor Q3 and the ground terminal. Switch S7 can be controlled by enable signal CV_EN. Enable signal CV_EN may indicate the operation state of the control circuit 3, such as by detecting an operation time period before silicon-controlled rectifier dimmer TRIAC is turned on, in order to effectively protect bleeder circuit 1.

When enable signal CV_EN is low, this indicates that silicon-controlled rectifier dimmer TRIAC is already turned on, and control circuit 3 may no longer adjust direct current bus voltage VBUS. Also, switch S7 may be turned on, a gate voltage of transistor Q3 can be pulled down to zero, transistor Q3 may be turned off, maximum current clamp circuit 11 can exit the protection state, and bleeder circuit 1 may no longer sink the bleeder current. When enable signal CV_EN is a high level, this indicates that control circuit 3 adjusts direct current bus voltage VBUS, switch S7 may be turned off, and transistor Q3 can enter the protection state under control of voltage source V3. It should be understood that, in other examples, the maximum current clamp circuit may also be implemented by other structures, and the state of the bleeder circuit may be controlled in other manners. For example, a switch controlled by enable signal CV_EN can connect to the gate of transistor Q1 to control the bleeder circuit.

Figure 9:
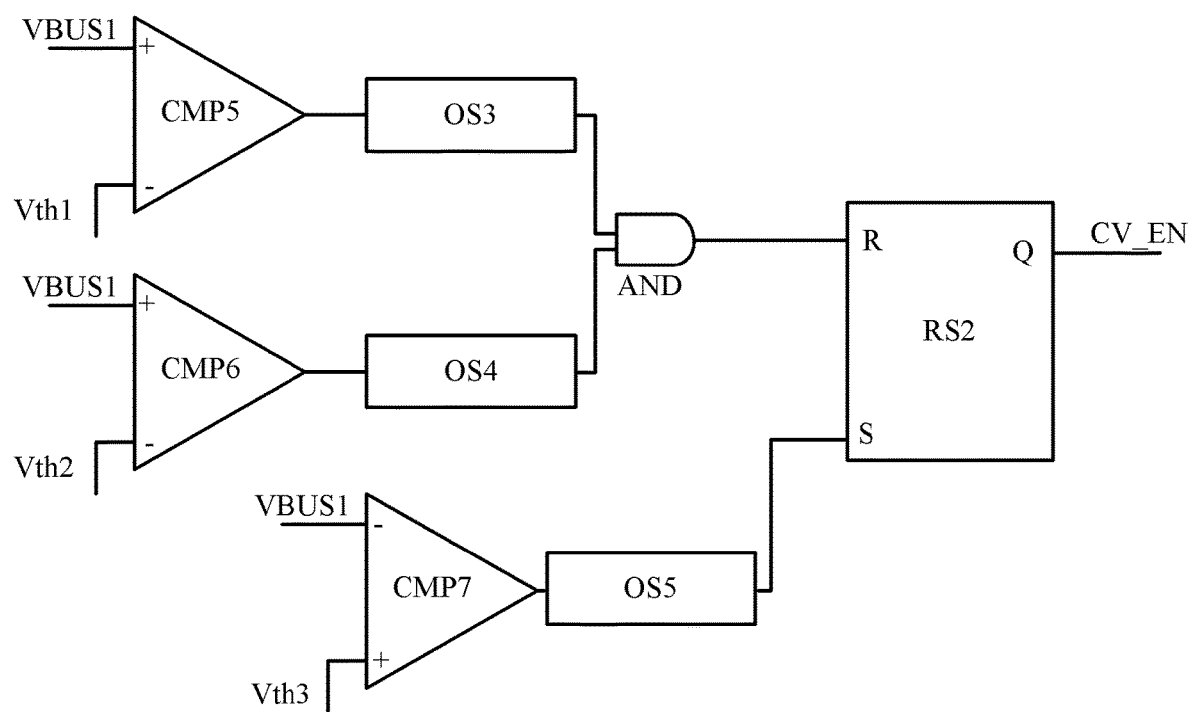
FIG. 9 is a schematic block diagram of an example enable signal generating circuit for controlling a clamp circuit, in accordance with embodiments of the present invention.

Referring now to FIG. 9, shown is a schematic block diagram of an example enable signal generating circuit for controlling a clamp circuit, in accordance with embodiments of the present invention. Enable signal generating circuit 33*a* may serve as part of bleeding controller 33, or may be a separate circuit module/structure. In this particular example, enable signal generating circuit 33*a* can include comparators CMP5-COM7, one-shot circuits OS3-OS5, AND-gate AND, and RS trigger RS2. Comparator CMP5 can compare direct current bus voltage sampling signal VBUS1 against threshold Vth1. One-shot circuit OS3 can generate a pulse signal having a predetermined length in response to a rising edge or a falling edge of an output signal of comparator CMP5. Comparator CMP6 can compare the direct current bus voltage sampling signal VBUS1 against threshold Vth2.

One-shot circuit OS4 can generate a pulse signal having a predetermined length in response to a rising edge or a falling edge of an output signal of comparator CMP6. Two input terminals of AND-gate AND can connect to output terminals of one-shot circuits OS3 and OS4, respectively, and an output terminal of AND-gate AND can connect to a reset terminal of RS trigger RS2. Comparator CMP7 can compare the direct current bus voltage sampling signal VBUS1 against threshold Vth3. One-shot circuit OS5 can generate a pulse signal having a predetermined length in response to a rising edge or a falling edge of an output signal of comparator CMP7. An output terminal of one-shot circuit OS5 can connect to a set terminal of RS trigger RS2.

Figure 10:
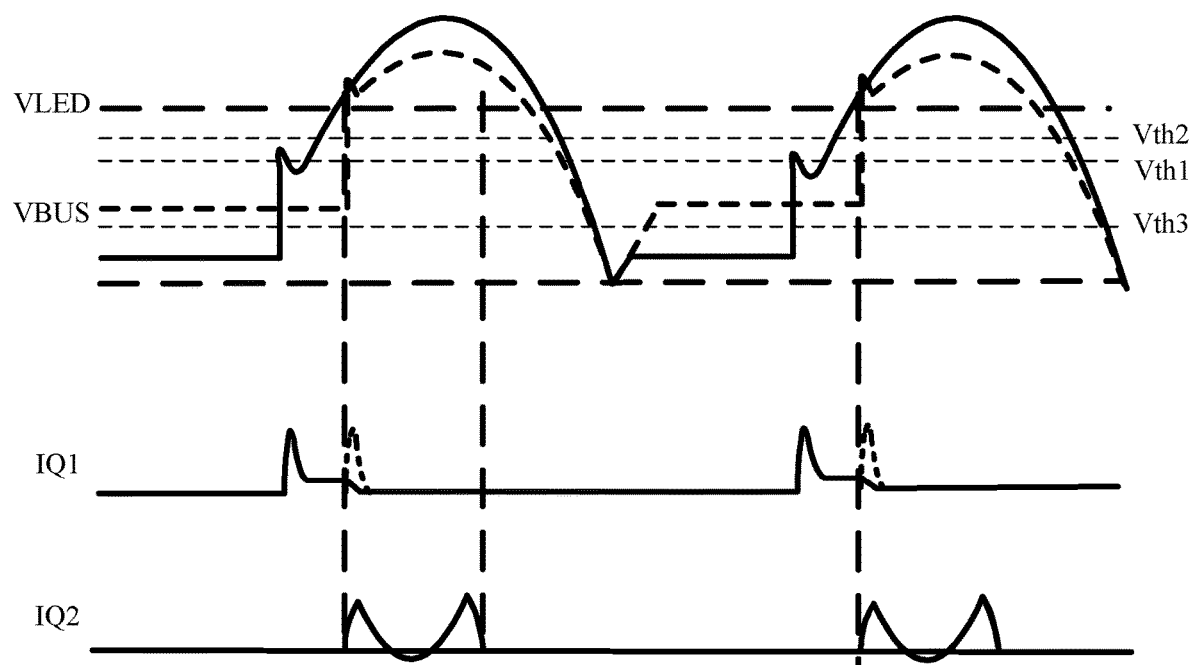
FIG. 10 is a waveform diagram of example operation of the LED drive circuit, in accordance with embodiments of the present invention.

Referring now to FIG. 10, shown is a waveform diagram of example operation of the LED drive circuit, in accordance with embodiments of the present invention. Here, waveforms of VBUS and IQ1 with solid lines are operation waveforms when direct current bus voltage VBUS before silicon-controlled rectifier dimmer TRIAC is turned on is set to a constant voltage, and the waveforms of VBUS and IQ1 with dotted lines are waveforms obtained by performing controlling in accordance with particular embodiments. In this example, at the beginning of each operation period, direct current bus voltage sampling signal VBUS1 is less than threshold Vth3, and thus a pulse signal may be triggered to set RS trigger RS2. Enable signal CV_EN can switch to a high level, which may indicate that silicon-controlled rectifier dimmer TRIAC is turned off. Enable signal CV_EN may control the maximum current clamp circuit to enter the protection state, and bleeding controller 33 may perform constant voltage control based on conduction angle signal Vcd, such that the direct current bus voltage corresponds to reference voltage CVREF.

If silicon-controlled rectifier dimmer TRIAC is turned on, direct current bus voltage VBUS may rapidly rise. Direct current bus voltage sampling signal VBUS1 can successively rise to a value greater than threshold Vth1 and a value greater than threshold Vth2 in a short time period, in order to respectively trigger two pulse signals. If direct current bus voltage sampling signal VBUS1 rises too fast, the two pulse signals may overlap. In this case, AND-gate AND may output a pulse signal to reset RS trigger RS2. Enable signal CV_EN may transition to a low level, which can indicate that silicon-controlled rectifier dimmer TRIAC is turned on. Enable signal CV_EN can control the maximum current clamp circuit to exit the protection state, and the direct current bus voltage may increase along with the input voltage, rather than under constant voltage control. In this way, the operation state of silicon-controlled rectifier dimmer TRIAC can effectively be detected. It should be understood that enable signal generating circuit 33*a* may also be implemented by other logic circuits in other examples.

Before silicon-controlled rectifier dimmer TRIAC is turned on, direct current bus voltage VBUS may be in a constant voltage state by controlling the bleeder circuit. In this example, the desired value of the direct current bus voltage can be adjustable. When the conduction angle is relatively large, the desired value can be controlled to be increased so as to delay the turn-on time instant. In this way, direct current bus voltage VBUS when silicon-controlled rectifier dimmer TRIAC is turned on can be near lighting voltage VLED by performing controlling, regardless of changes in the conduction angle of the silicon-controlled rectifier dimmer and/or properties of the silicon-controlled rectifier dimmer.

Further, as compared with the waveforms of VBUS and IQ1 with solid lines, the bleeder current of the circuit may have a relatively small pulse only in a short time period after the silicon-controlled rectifier dimmer is turned on, and can remain low in other time periods than the short time period. This can avoid circuit losses that may be caused by the bleeder circuit being required to sink the bleeder current before and after the silicon-controlled rectifier dimmer is turned on. Therefore, in particular embodiments, losses of the bleeder circuit can be reduced, and system efficiency can be improved. Bleeder circuit 1 and control circuit 3 may form an apparatus or circuit structure that can be used in combination with various silicon-controlled rectifier dimmers, rectification circuits, and linear drive circuits to form dimmable LED drive circuitry.

Figure 11:
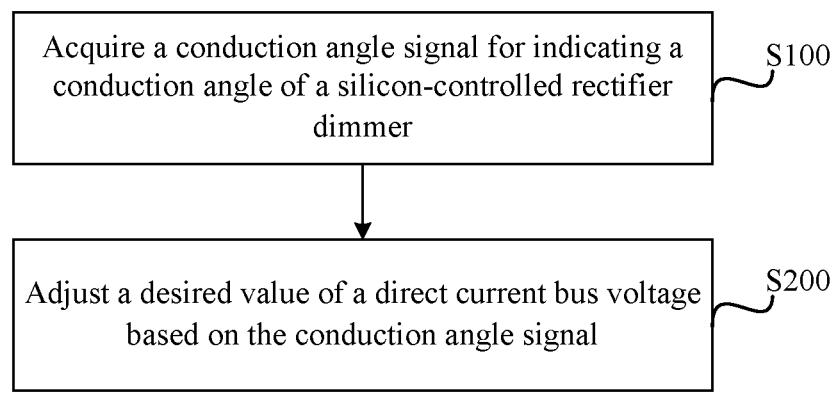
FIG. 11 is a flow diagram of an example method of controlling an LED drive circuit, in accordance with embodiments of the present invention.

Referring now to FIG. 11, shown is a flow diagram of an example method of controlling an LED drive circuit, in accordance with embodiments of the present invention. In this particular example, when a conduction angle signal is greater than an angle threshold, a direct current bus voltage may be adjusted to delay a turn-on time instant of the silicon-controlled rectifier dimmer. For example, when the conduction angle signal is greater than the angle threshold, the direct current bus voltage can be increased such that an absolute value of a difference between the direct current bus voltage when the silicon-controlled rectifier dimmer is turned on and a predetermined lighting voltage of an LED load is within a predetermined range.

For example, when the conduction angle signal is greater than the angle threshold, the direct current bus voltage can be maintained at a first voltage that is set such that an absolute value of a difference between the direct current bus voltage when the silicon-controlled rectifier dimmer is turned on and a predetermined lighting voltage of an LED load is within a predetermined range. For example, when the conduction angle signal is greater than the angle threshold, the direct current bus voltage can be increased such that the direct current bus voltage when the silicon-controlled rectifier dimmer is turned on is not less than a predetermined lighting voltage of an LED load.

At S100, a conduction angle signal for indicating a conduction angle of the silicon-controlled rectifier dimmer can be acquired. At S200, a desired value of the direct current bus voltage may be adjusted based on the conduction angle signal. Further, S200 may be performed by adjusting the desired value such that the direct current bus voltage when the silicon-controlled rectifier dimmer is turned on is slightly greater than a predetermined lighting voltage. For example, when the conduction angle signal is greater than the angle threshold, the desired value can be controlled to change along with the conduction angle signal. In addition, when the conduction angle signal is less than the angle threshold, the desired value can be controlled to be a predetermined value equal to or greater than zero. Reference voltage CVREF for indicating the desired value may be adjusted based on the following formula (2).

$$CV_{REF} = (Vcd - Vcd\_ref) \times K + CV_{REF\_MIN} \quad (2)$$

Here, $CV_{REF}$ may denote the reference voltage, Vcd may denote the conduction angle signal, Vcd_ref may denote the angle threshold, and $CV_{REF\_MIN}$ may denote a reference voltage corresponding the predetermined value. The angle threshold can be set to correspond to the conduction angle signal when the direct current bus voltage is equal to the predetermined lighting voltage during the conduction of the silicon-controlled rectifier dimmer, and K may denote a predetermined adjustment coefficient.

Further, S100 may be performed by detecting the direct current bus voltage to acquire the conduction angle signal of the silicon-controlled rectifier dimmer, or by detecting a drive current of an LED load to acquire the conduction angle signal. The detecting the direct current bus voltage to acquire the conduction angle signal of the silicon-controlled rectifier dimmer can include acquiring a signal for indicating a time period from a time instant when the direct current bus voltage rises to a voltage greater than a first threshold to a time instant when the direct current bus voltage decreases to a voltage less than a second threshold to acquire the conduction angle signal. The detecting a drive current of an LED load to acquire the conduction angle signal can include acquiring a signal for indicating a time period during which the drive current is continuously greater than a third threshold to acquire the conduction angle signal.

In particular embodiments, the direct current bus voltage during the bleeding can be controlled to be constant, and the desired value of the direct current bus voltage may be adjustable, such that the turn-on time instant can be delayed when the conduction angle is large, and the direct current bus voltage can rapidly rise to a voltage greater than the lighting voltage when the silicon-controlled rectifier dimmer is turned on. In this way, it may not be required to sink the bleeder current for a relatively long time period after the silicon-controlled rectifier dimmer is turned on, which can effectively reduce system losses and improve efficiency.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
   a) a light-emitting diode (LED) drive circuit having a silicon-controlled rectifier dimmer;
   b) a rectification circuit coupled to the silicon-controlled rectifier dimmer, wherein the rectification circuit is configured to generate a direct current bus voltage; and
   c) a bus voltage adjustment circuit configured to adjust the direct current bus voltage in accordance with conduction angle information of the silicon-controlled rectifier dimmer by increasing the direct current bus voltage to delay a turn-on time instant of the silicon-controlled rectifier dimmer when a conduction angle signal is greater than an angle threshold.

2. The apparatus of claim 1, wherein the direct current bus voltage is increased such that an absolute value of a difference between the direct current bus voltage when the silicon-controlled rectifier dimmer is turned on and a predetermined lighting voltage of the LED load is within a predetermined range.

3. The apparatus of claim 2, wherein:
   a) the bus voltage adjustment circuit is configured to control the direct current bus voltage to be maintained at a first voltage when the conduction angle signal is greater than the angle threshold;
   b) the first voltage is set so that an absolute value of a difference between the direct current bus voltage when the silicon-controlled rectifier dimmer is turned on and the predetermined lighting voltage is within the predetermined range; and c) the first voltage is generated based on the conduction angle signal.

4. The apparatus of claim 1, wherein the bus voltage adjustment circuit is configured to increase the direct current bus voltage when the conduction angle signal is greater than the angle threshold, such that the direct current bus voltage when the silicon-controlled rectifier dimmer is turned on is not less than a predetermined lighting voltage of the LED load.

5. The apparatus of claim 1, wherein the bus voltage adjustment circuit comprises:
   a) a bleeder circuit configured to receive an output signal of the rectification circuit; and
   b) a control circuit configured to control a bleeder current of the bleeder circuit to adjust the direct current bus voltage in order to delay the turn-on time instant of the silicon-controlled rectifier dimmer when the conduction angle signal is greater than the angle threshold.

6. The apparatus of claim 5, wherein the control circuit is configured to adjust a desired value of the direct current bus voltage to adjust the bleeder current such that the direct current bus voltage when the silicon-controlled rectifier dimmer is turned on is not less than a predetermined lighting voltage of the LED load.

7. The apparatus of claim 5, wherein the control circuit is configured to control a desired value of the direct current bus voltage in accordance with the conduction angle signal when the conduction angle signal is greater than the angle threshold, and to control the desired value of the direct current bus voltage to be a predetermined value when the conduction angle signal is less than the angle threshold.

8. The apparatus of claim 7, wherein:
   a) the control circuit is configured to control, when the conduction angle signal is greater than the angle threshold, a reference voltage for indicating the desired value to meet the formula $CV_{REF}=(Vcd-Vcd\_ref) \times K + CV_{REF\_MIN}$;
   b) $CV_{REF}$ denotes the reference voltage;
   c) Vcd denotes the conduction angle signal;
   d) Vcd_ref denotes the angle threshold;
   e) $CV_{REF\_MIN}$ denotes a reference voltage corresponding the predetermined value;
   f) the angle threshold is set to correspond to the conduction angle signal when the direct current bus voltage is equal to the predetermined lighting voltage during the conduction of the silicon-controlled rectifier dimmer; and
   g) K denotes a predetermined adjustment coefficient.

9. The apparatus of claim 5, wherein the control circuit is configured to detect at least one of the direct current bus voltage, and a drive current of the LED load, to acquire the conduction angle signal.

10. The apparatus of claim 9, wherein the control circuit comprises a detection circuit configured to perform at least one of to acquire the conduction angle signal:
   a) when the control circuit detects the direct current bus voltage, acquire a signal for indicating a time period from a time instant when the direct current bus voltage rises to a voltage greater than a first threshold to a time instant when the direct current bus voltage decreases to a voltage less than a second threshold; and
   b) when the control circuit detects drive current of the LED load, acquire a signal for indicating a time period during which the drive current is continuously greater than a third threshold.

11. A dimmable LED drive circuit, comprising the apparatus of claim 1, and further comprising a linear drive circuit configured to control a drive current flowing through an LED load.

12. A method of controlling a light-emitting diode (LED) drive circuit with a silicon-controlled rectifier dimmer, the method comprising:
   a) acquiring a conduction angle signal for indicating conduction angle information of the silicon-controlled rectifier dimmer;
   b) generating, by a rectification circuit coupled to the silicon-controlled rectifier dimmer, a direct current bus voltage; and
   c) adjusting the direct current bus voltage in accordance with the conduction angle information of the silicon-controlled rectifier dimmer by increasing the direct current bus voltage to delay a turn-on time instant of the silicon-controlled rectifier dimmer when the conduction angle signal is greater than an angle threshold.

13. The method of claim 12, wherein the direct current bus voltage is increased such that an absolute value of a difference between the direct current bus voltage when the silicon-controlled rectifier dimmer is turned on and a predetermined lighting voltage of an LED load is in a predetermined range.

14. The method of claim 12, further comprising:
   a) maintaining the direct current bus voltage at a first voltage when the conduction angle signal is greater than the angle threshold;
   b) setting the first voltage is set such that an absolute value of a difference between the direct current bus voltage when the silicon-controlled rectifier dimmer is turned on and a predetermined lighting voltage of an LED load is in a predetermined range; and
   c) generating the first voltage based on the conduction angle signal.

15. The method of claim 12, further comprising, when the conduction angle signal is greater than the angle threshold, increasing the direct current bus voltage such that the direct current bus voltage when the silicon-controlled rectifier dimmer is turned on is not less than a predetermined lighting voltage of an LED load.

16. The method of claim 12, further comprising adjusting a desired value of the direct current bus voltage based on the conduction angle signal.

17. The method of claim 16, further comprising adjusting the desired value such that the direct current bus voltage when the silicon-controlled rectifier dimmer is turned on is not less than a predetermined lighting voltage.

18. The method of claim 16, further comprising:
   a) controlling the desired value to change with the conduction angle signal when the conduction angle signal is greater than the angle threshold; and
   b) controlling the desired value to be a predetermined value when the conduction angle signal is less than the angle threshold.

19. The method of claim 18, wherein:
   a) when the conduction angle signal is greater than the angle threshold, a reference voltage for indicating the desired value is controlled to meet the formula $CV_{REF}=(Vcd-Vcd\_ref) \times K + CV_{REF\_MIN}$;
   b) $CV_{REF}$ denotes the reference voltage;
   c) Vcd denotes the conduction angle signal;
   d) Vcd_ref denotes the angle threshold;
   e) $CV_{REF\_MIN}$ denotes a reference voltage corresponding the predetermined value;

f) the angle threshold is set to correspond to the conduction angle signal when the direct current bus voltage is equal to the predetermined lighting voltage during the conduction of the silicon-controlled rectifier dimmer; and g) K denotes a predetermined adjustment coefficient.

20. The method of claim 16, wherein acquiring the conduction angle signal of the silicon-controlled rectifier dimmer comprises at least one of:

a) detecting the direct current bus voltage to acquire the conduction angle signal of the silicon-controlled rectifier dimmer; and b) detecting a drive current of an LED load to acquire the conduction angle signal.

* * * * *